US012585436B1

(12) United States Patent (10) Patent No.: US 12,585,436 B1
Morello et al. (45) Date of Patent: Mar. 24, 2026

(54) TECHNIQUES FOR SECURING COMPUTING ENVIRONMENTS VIA SOFTWARE IMAGES CONTAINING EMBEDDED SECRETS

(71) Applicant: MINIMUS LTD, Tel Aviv (IL)

(72) Inventors: John Morello, Baton Rouge, LA (US);
Ben Bernstein, New York, NY (US);
Dima Stopel, Herzliya (IL)

(73) Assignee: MINIMUS LTD, Tel Aviv (IL)

( * ) Notice: Subject to any disclaimer, the term of this patent is extended or adjusted under 35 U.S.C. 154(b) by 0 days.

(21) Appl. No.: 19/191,034

(22) Filed: Apr. 28, 2025

Related U.S. Application Data

(60) Provisional application No. 63/735,955, filed on Dec. 19, 2024, provisional application No. 63/720,901, filed on Nov. 15, 2024.

(51) Int. Cl.
*G06F 8/30* (2018.01)
*G06F 8/61* (2018.01)
(52) U.S. Cl.
CPC . *G06F 8/30* (2013.01); *G06F 8/63* (2013.01)
(58) Field of Classification Search
CPC ................. G06F 8/30; G06F 8/63; G06F 8/60
See application file for complete search history.

(56) References Cited

U.S. PATENT DOCUMENTS 8,199,375 B2    6/2012  Saito et al.
9,959,104 B2    5/2018  Chen et al.
9,983,891 B1    5/2018  Christensen
10,002,247 B2   6/2018  Suarez et al.
10,505,830 B2   12/2019  Mishalov et al.
10,885,378 B2   1/2021  Li et al.
11,062,022 B1*  7/2021  Kalamkar ........... G06F 9/45558
(Continued)

FOREIGN PATENT DOCUMENTS

CN          111522628 A      8/2020

OTHER PUBLICATIONS

"Announcing 'Yum + RPM for Containerized Applications'—Nulecule & Atomic App," Red Hat Blog (Jun. 23, 2015) (available at https://www.redhat.com/en/blog/announcing-yum-rpm-containerized-applications-nulecule-atomic-app) (last accessed Nov. 7, 2024, at 4:27 PM Eastern time).

(Continued)

*Primary Examiner* — Marina Lee
(74) *Attorney, Agent, or Firm* — M&B IP Analysts, LLC

(57) ABSTRACT

A system and method for securing software images. A method includes generating software packages. Each software package is generated using a respective set of code. A first software package of the software packages includes code that configures a system to secure a computing environment based on a secret when executed. A software image is built based on a file, where the file includes a set of instructions for combining a subset of the software packages including the first software package and instructions for embedding the secret in order to build the software image. Building the software image further includes combining the subset of software packages according to the file and embedding the secret in the software image; and providing the software image for execution. The software image is executed by the system and, when executed, configures the system to deploy the software component based on the subset of software packages.

19 Claims, 8 Drawing Sheets

(56) References Cited

U.S. PATENT DOCUMENTS

| | | | |
|---|---|---|---|
| 11,182,140 B2 | 11/2021 | Riek et al. | |
| 11,599,348 B2 | 3/2023 | Goldmann et al. | |
| 11,669,362 B2 | 6/2023 | Singh et al. | |
| 11,972,333 B1 | 4/2024 | Horesh et al. | |
| 12,095,806 B1 | 9/2024 | Nemtsov et al. | |
| 12,099,414 B2 | 9/2024 | Mitkar et al. | |
| 12,242,994 B1 | 3/2025 | Aggarwal et al. | |
| 12,267,345 B1 | 4/2025 | Erlingsson et al. | |
| 2011/0225574 A1 | 9/2011 | Khalidi et al. | |
| 2012/0110333 A1* | 5/2012 | Lukkarila | G06F 21/51 |
| | | | 713/193 |
| 2012/0324446 A1* | 12/2012 | Fries | H04L 9/3236 |
| | | | 718/1 |
| 2015/0365437 A1 | 12/2015 | Bell, Jr. et al. | |
| 2017/0147813 A1 | 5/2017 | McPherson et al. | |
| 2018/0309747 A1* | 10/2018 | Sweet | G06F 9/45558 |
| 2019/0260716 A1 | 8/2019 | Lerner | |
| 2019/0347127 A1 | 11/2019 | Coady et al. | |
| 2020/0159536 A1 | 5/2020 | Saidi | |
| 2020/0213357 A1 | 7/2020 | Levin et al. | |
| 2020/0285504 A1 | 9/2020 | Siegmund | |
| 2020/0326931 A1 | 10/2020 | Nadgowda et al. | |
| 2021/0157623 A1 | 5/2021 | Chandrashekar et al. | |
| 2021/0208916 A1 | 7/2021 | Wang et al. | |
| 2021/0209221 A1* | 7/2021 | Gerebe | H04L 63/08 |
| 2021/0255840 A1* | 8/2021 | Novy | G06F 8/63 |
| 2021/0319109 A1* | 10/2021 | Weng | G06F 9/4401 |
| 2022/0147378 A1* | 5/2022 | Tarasov | G06F 16/196 |
| 2022/0166626 A1* | 5/2022 | Madisetti | H04L 9/50 |
| 2023/0168986 A1 | 6/2023 | Larkin et al. | |
| 2024/0069883 A1 | 2/2024 | Griffin et al. | |
| 2024/0103833 A1 | 3/2024 | Shemer et al. | |
| 2024/0134967 A1 | 4/2024 | Yaron et al. | |
| 2024/0411674 A1 | 12/2024 | Zmigrod et al. | |
| 2025/0004741 A1 | 1/2025 | Hubik | |
| 2025/0123819 A1 | 4/2025 | Khemka et al. | |
| 2025/0156535 A1 | 5/2025 | Keller et al. | |

OTHER PUBLICATIONS

Ian Gorton et al.; Components in the Pipeline; IEEE; pp. 34-40; retrieved on Jul. 18, 2025 (Year: 2025).

* cited by examiner

TECHNIQUES FOR SECURING COMPUTING ENVIRONMENTS VIA SOFTWARE IMAGES CONTAINING EMBEDDED SECRETS

CROSS-REFERENCE TO RELATED APPLICATIONS

This application claims the benefit of U.S. Provisional Patent Application No. 63/735,955 filed on Dec. 19, 2024. This application also claims the benefit of U.S. Provisional Patent Application No. 63/720,901 filed on Nov. 15, 2024. All of the applications referenced above are hereby incorporated by reference.

TECHNICAL FIELD

The present disclosure relates generally to software image cybersecurity, and more specifically to securing software images via embedded secrets.

BACKGROUND

Software images are files containing code and other resources used to realize one or more software components. Example software images include software container images used to realize software containers, as well as virtual machine (VM) images used to realize virtual machines. Executing the code within a software image causes a software component such as a container or virtual machine to be deployed within a computing environment.

Manipulation or improper access to software components realized via software images may allow unauthorized entities to improperly access resources within a computing environment. Techniques for protecting against such unauthorized access are therefore highly desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for securing computing environments using software images with embedded secrets. The method comprises: generating a plurality of software packages, wherein each software package is generated using a respective set of code, wherein a first software package of the plurality of software packages includes code that configures a system to secure a computing environment based on a secret when executed; building a software image based on a file, wherein the file includes a set of instructions for combining a subset of the plurality of software packages including the first software package and for embedding the secret in order to build the software image, wherein building the software image further comprises combining the subset of the plurality of software packages according to the file, wherein building the software image further comprises embedding the secret in the software image; and providing the software image for execution, wherein the software image is executed by the system, wherein the software image configures the system to deploy the software component based on the subset of the plurality of software packages when executed.

Certain embodiments disclosed herein also include a non-transitory computer-readable medium having stored thereon causing a processing circuitry to execute a process, the process comprising: generating a plurality of software packages, wherein each software package is generated using a respective set of code, wherein a first software package of the plurality of software packages includes code that configures a system to secure a computing environment based on a secret when executed; building a software image based on a file, wherein the file includes a set of instructions for combining a subset of the plurality of software packages including the first software package and for embedding the secret in order to build the software image, wherein building the software image further comprises combining the subset of the plurality of software packages according to the file, wherein building the software image further comprises embedding the secret in the software image; and providing the software image for execution, wherein the software image is executed by the system, wherein the software image configures the system to deploy the software component based on the subset of the plurality of software packages when executed.

Certain embodiments disclosed herein also include a system for securing computing environments using software images with embedded secrets. The system comprises: a processing circuitry; and a memory, the memory containing instructions that, when executed by the processing circuitry, configure the system to: generate a plurality of software packages, wherein each software package is generated using a respective set of code, wherein a first software package of the plurality of software packages includes code that configures a system to secure a computing environment based on a secret when executed; build a software image based on a file, wherein the file includes a set of instructions for combining a subset of the plurality of software packages including the first software package and for embedding the secret in order to build the software image, wherein building the software image further comprises combining the subset of the plurality of software packages according to the file, wherein building the software image further comprises embedding the secret in the software image; and provide the software image for execution, wherein the software image is executed by the system, wherein the software image configures the system to deploy the software component based on the subset of the plurality of software packages when executed Certain embodiments disclosed herein include a method, non-transitory computer-readable medium, or system as noted above or below, wherein the first software package further includes code that, when executed, configures the system to validate a signature based on the secret, wherein access is granted to the software component when the signature has been validated.

Certain embodiments disclosed herein include a method, non-transitory computer-readable medium, or system as noted above or below, wherein the secret is a signature, wherein the system is configured to grant access to the software component when the signature is presented to the system.

Certain embodiments disclosed herein include a method, non-transitory computer-readable medium, or system as noted above or below, wherein the secret is associated with at least one first computing environment of a plurality of computing environments, wherein each of the at least one first computing environment corresponds to a first entity of a plurality of entities, wherein the secret is only embedded in files among a plurality of files to be used for the at least one first computing environment.

Certain embodiments disclosed herein include a method, non-transitory computer-readable medium, or system as noted above or below, wherein the secret is a first secret of a plurality of secrets, wherein the plurality of secrets is defined with respect to a hierarchy, wherein the system is configured to control access to the software component based further on the hierarchy.

Certain embodiments disclosed herein include a method, non-transitory computer-readable medium, or system as noted above or below, wherein the system is a first system, wherein the secret is a private key, further including or being configured to perform the following step or steps: providing, to at least one second system deployed in a computing environment, a public key which corresponds to the private key, wherein each of the at least one second system is configured to authenticate to the first system using the public key.

Certain embodiments disclosed herein include a method, non-transitory computer-readable medium, or system as noted above or below, wherein the code of the first software package further configures the system to encrypt data in the computing environment using the secret when executed.

Certain embodiments disclosed herein include a method, non-transitory computer-readable medium, or system as noted above or below, further including or being configured to perform the following step or steps: configuring each of the plurality of software images based on a plurality of files, wherein the set of instructions for each file further defines a configuration for the corresponding software image.

Certain embodiments disclosed herein include a method, non-transitory computer-readable medium, or system as noted above or below, wherein each software package is a unit of code defined with respect to at least one function.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

4

Figure 7:
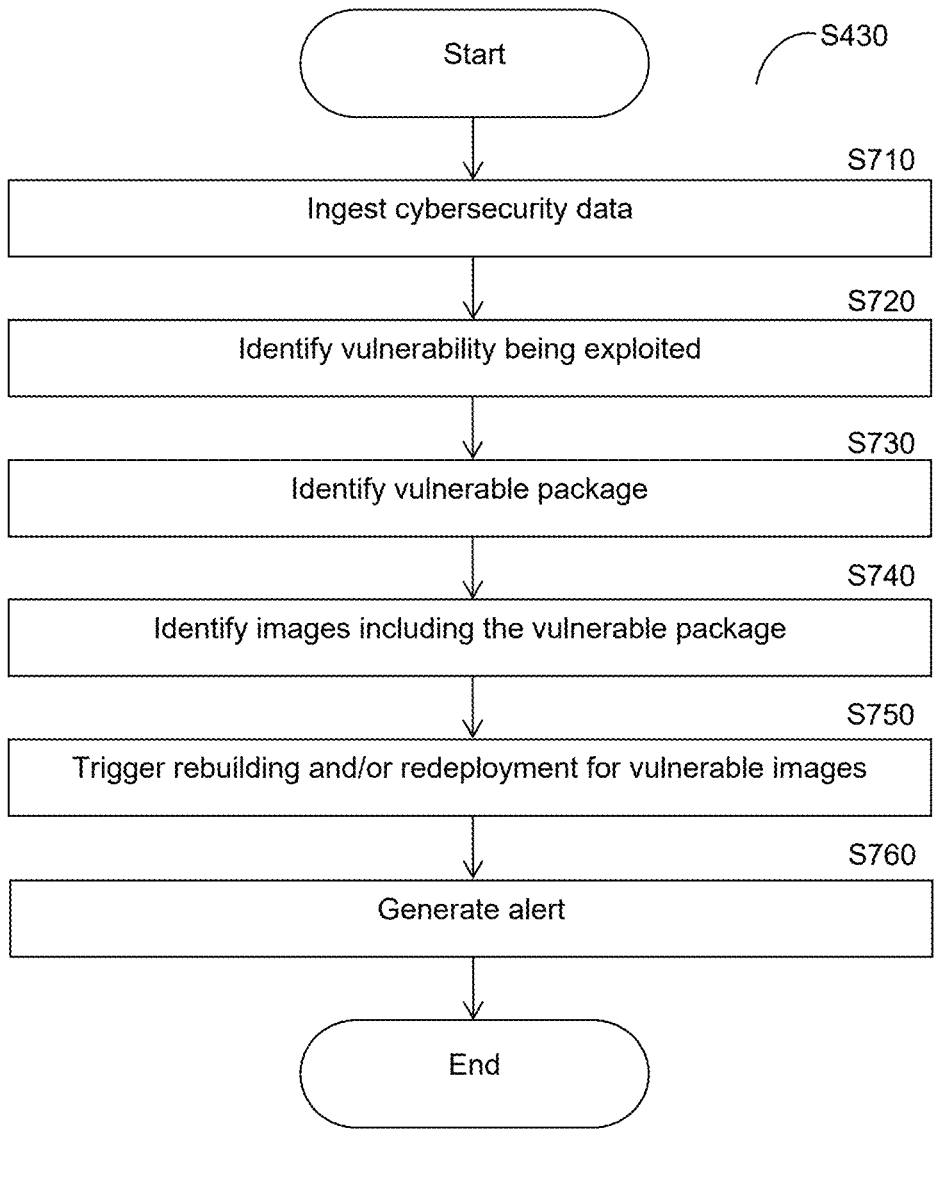

FIG. 7 is a flowchart illustrating a method for detecting a software image redeployment trigger according to an embodiment.

Figure 8:
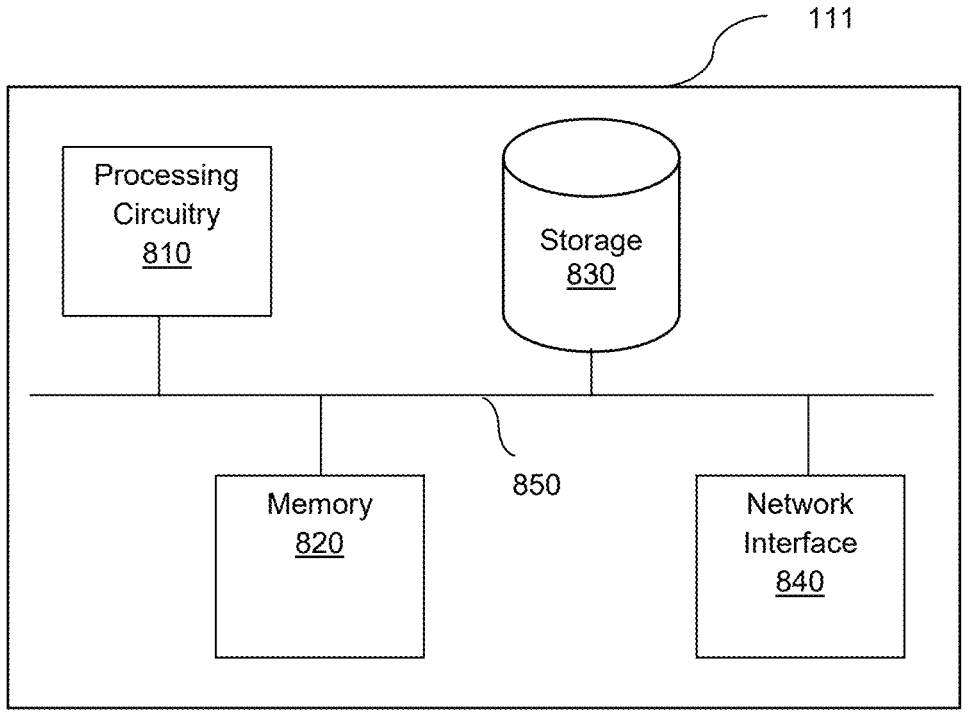

FIG. 8 is a schematic diagram of an image manager according to an embodiment.

DETAILED DESCRIPTION

The various disclosed embodiments include techniques for securing software components via embedded secrets as well as a software image management platform which may be utilized to secure software images. In accordance with various disclosed embodiments, software image recipes define corresponding software images as respective combinations of software packages, and at least some of the software image recipes define their corresponding software images as containing embedded secrets. When a software image recipe is used to build an instance of the corresponding software image, the resulting software image includes the respective combination of packages and any secrets are embedded into the software image.

In accordance with various disclosed embodiments, the embedded secrets are used by a system executing the software image in order to secure a software component such as the software component realized via the software image. As a non-limiting example, a software container image executed in order to generate a software component in the form of a software container may include an embedded key used to control access to the software container or otherwise to secure computing environment in which the software container is deployed.

More specifically, a system executing the software image built using a software image recipe defining an embedded secret becomes configured to secure a computing environment in which the software image is deployed (e.g., a computing environment in which a software component realized by executing the software component is deployed) based on the embedded secret.

Securing the computing environment may include, but is not limited to, controlling access to one or more software components (e.g., a software component realized via execution of the software image) based on the embedded secret, encrypting data in storage (e.g., encrypting code or other data of the software image at rest), encrypting traffic (e.g., encrypting traffic between the software component realized using the software image and one or more external systems), combinations thereof, and the like.

In some embodiments, the secret is a private key, and the system is configured to secure the environment using the private key by encrypting data using the private key such that the data can only be decrypted using the corresponding public key. As a non-limiting example, access to a software component may be controlled by providing data encrypted using the private key and verifying that the data has been correctly decrypted via a public key corresponding to the private key. As another non-limiting example, data at rest or traffic may be encrypted using the private key such that the data can only be decrypted using the corresponding public key.

In an embodiment, in order to cause the system executing the software image to become configured to secure a computing environment based on the embedded secret, the combination of software packages defined for the software images includes one or more software packages containing code that, when executed by the system, configures the system to secure the computing environment based on the embedded secret. By defining software images with respect to these access control software packages, cybersecurity in the computing environments in which these software images are deployed may be conveniently secured, for example, in order to secure their corresponding software components.

Various disclosed embodiments may be utilized to manage deployments of software images. Each software image is a file including executable code utilized to realize a given software component such as, but not limited to, a software container, a virtual machine, and the like. More specifically, each software image includes all of the code utilized to run a given software component, and may further include libraries, binaries, settings, and other data used to realize the corresponding software component. When a software image is for a virtual machine, the software image may further include an operating system, applications, and other data used to realize a virtual machine. Various disclosed embodiments may allow for efficiently rebuilding and redeploying software images for use in computing environments.

To facilitate building software images, various disclosed embodiments utilize software image recipes in order to combine packages of code and configure images according to a predefined set of heuristics. To this end, each software image recipe may be realized as a file including a set of instructions for building and configuring a software component such as a software container or virtual machine according to a predetermined definition of the software component. In accordance with various disclosed embodiments, any or all of the software image recipes may define secrets (e.g., keys) to be embedded within software images built using those recipes. The set of instructions of each software image recipe may therefore be utilized to effectuate a set of rules for building and configuring the software component.

More specifically, the set of instructions of each software image recipe defines a corresponding software image with respect to a combination of packages such that the software image built using a given software image recipe includes each package among the combination of packages of the software image recipe. To this end, the set of instructions of each software image includes a description of each package to be used for building the software image and a description of how to obtain a latest version or release of the code of each package. The description of each package may be or may include an identifier (e.g., a name or identification number) of each portion of code used to create the package. The description of how to obtain the latest version or release of the code of each package may be or may include an indication of a location where each portion of code for each package is stored (e.g., in one or more code repositories).

Accordingly, the software image recipes provide instructions for building software images defined with respect to code units in the form of packages, where combinations of packages may be used to realize different software images. In this regard, the packages may act as building blocks for software images, with the software image recipes providing the directions for combining these building blocks in order to assemble the code of a software image. That is, the packages may be adapted to perform discrete functions or sets of functions which might be utilized by different software images such that a given package may be used to provide its respective functions to different software images whose software image recipes indicate that the package is to be used for building their corresponding software images.

In an embodiment, using software image recipes, software images are built. More specifically, the definitions among the software image recipes are used to identify portions of code belonging to packages for each software image. The portions of code may include, but are not limited to, binaries and any associated files. The portions of code are obtained and used to create the packages. Using the software image recipes, sets of the packages are combined into software images and configured. The software images may be stored in a repository for subsequent use, for example, in order to provide the software images to systems or external image repositories for deployment within a computing environment.

In some embodiments, in order to reduce the amount of computing resources utilized to rebuild and transmit software images, software images may be redeployed according to image redeployment rules. Such image redeployment rules may define triggers for redeploying software images such that, for example, a software image is only rebuilt, transmitted, redeployed, or a combination thereof, when a redeployment trigger is detected with respect to the software image. Further, any or all of the redeployment triggers may be defined with respect to cybersecurity data such as, but not limited to, alerts or other cybersecurity data indicating that a vulnerability is being exploited. More specifically, using such cybersecurity data, a vulnerable package may be identified. Such a vulnerable package is a package containing code which includes the vulnerability that is being exploited. Software images containing vulnerable packages are identified using the software image recipes, and any software images containing vulnerable packages may be rebuilt using packages containing new code (e.g., new code releases designed to patch or otherwise address the vulnerability).

Various disclosed embodiments therefore provide a platform for maintaining software images in a manner that allows for automatically rebuilding software images with new code as new code releases are provided. By defining software image recipes with respect to combinations of code packages, each software image may effectively be defined with respect to a set of discrete units of code. This allows for identifying updates to code used by different software images, thereby allowing for automatically identifying code updates which affect certain software images and therefore indicate that a given software image might be rebuilt. Identifying images to be rebuilt in this manner, in turn, allows for maintaining images with current versions of code, which improves security of computing environments in which the software containers are deployed. Further, by enabling automation of software image rebuilding using a process that embeds keys used to secure the software images, the securing processes may also be automated and may be automatically applied to new software images built using the software image recipes.

Moreover, by defining packages as units of code with respect to certain functions or combinations of functions, the packages as defined in the software image recipes may be flexibly combined for different types of software images. That is, any given package may be used as part of the recipe for different types of software images such as, but not limited to, a software container image and a virtual machine image. By defining software image recipes with respect to different sets of functions, and further by separating portions of code which perform certain functions within a given software component from portions of code used to run the software component (such as the kernel, operating system, and applications used to realize a virtual machine), the packages may be utilized to build different types of software images.

In this regard, image repositories populated using software images as described herein may act as trusted sources for vulnerability-free or otherwise updated images. Further, such images may be further secured against potential malicious activity, thereby further ensuring that the images retrieved from these trusted sources are secure against potential cyber threats. Moreover, by storing and providing software as fully built images, challenges with respect to installing individual packages within other software and potential compatibility issues may be avoided, thereby providing a smoother code deployment.

Figure 1:
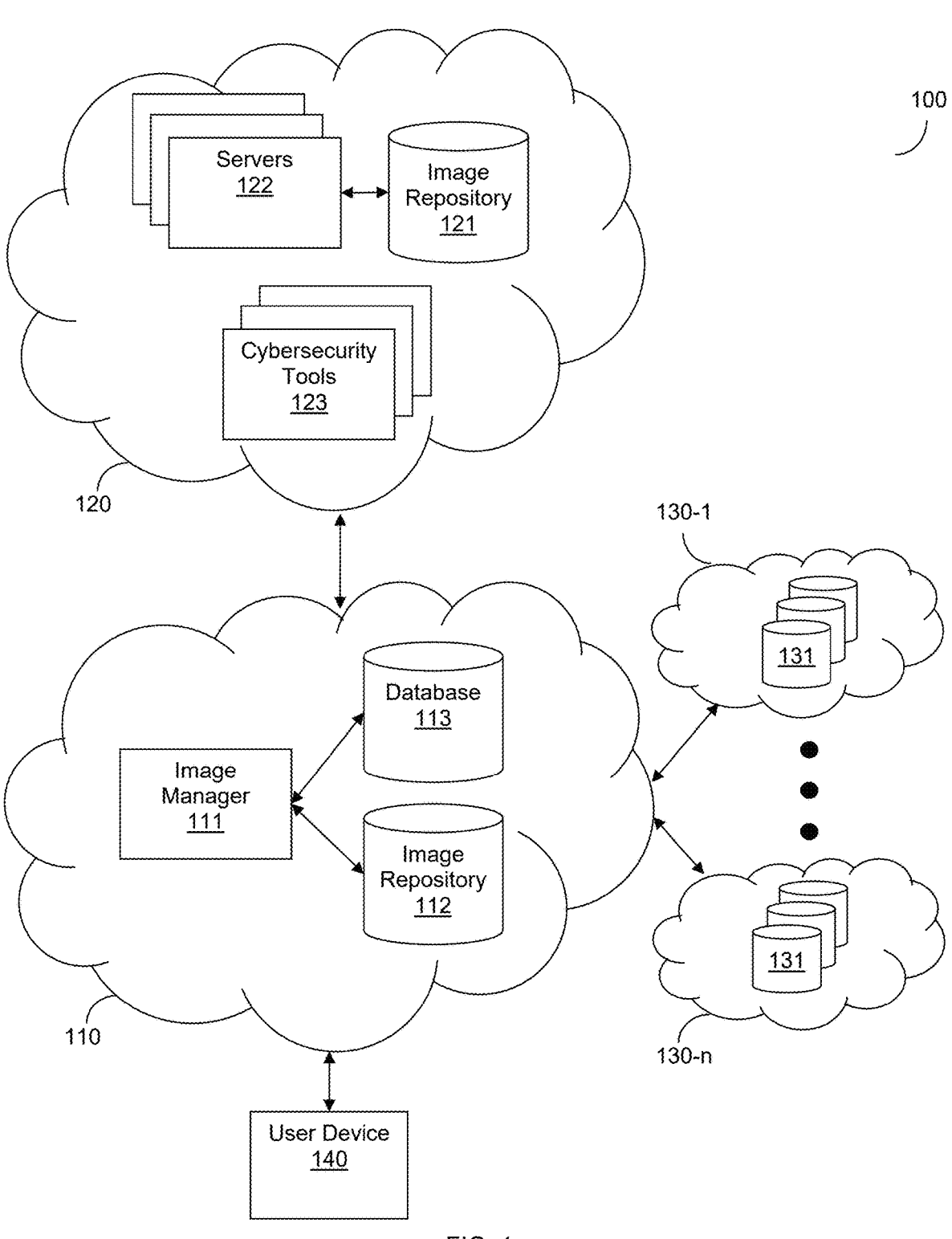
FIG. 1 is a network diagram utilized to describe various disclosed embodiments.

FIG. 1 shows an example network diagram 100 utilized to describe the various disclosed embodiments. In the example network diagram 100, computing environments 110 through 130 communicate with each other and with a user device 140 in order to realize various software image management techniques discussed herein. Any or all of such communications may be realized via one or more networks (not shown). Such a network may be, but is not limited to, a wireless, cellular or wired network, a local area network (LAN), a wide area network (WAN), a metro area network (MAN), the Internet, the worldwide web (WWW), similar networks, and any combination thereof.

As depicted in FIG. 1, the computing environment 110 is a computing environment in which an image manager 111 is deployed or otherwise realized. The image manager 111 may be realized as or via a server (not separately depicted). An example schematic diagram which may be utilized to realize such a server is discussed further below with respect to FIG. 8.

The image manager 111 is configured to manage software images used in one or more computing environments such as, but not limited to, the computing environment 120. More specifically, the image manager 111 is configured to build software images using software image recipes as described herein. As noted herein, such software image recipes may be, may include, or may otherwise be realized as a file including a set of instructions for building and configuring a software component such as a software container or virtual machine according to a predetermined definition of the software component. Such a recipe may be defined with respect to a set of packages as well as configuration data for configuring a software component containing these packages. The packages, in turn, are packages of code which may include code stored in one or more code repositories such as, but not limited to, the code repositories 131.

In accordance with various disclosed embodiments, the image manager 111 is configured to define software image recipes which include keys or other secrets to be embedded in software images. When software images are built using software images including embedded secrets, the resulting software image contains one or more embedded secrets.

The secrets may be utilized to secure computing environments in which the software images are deployed, for example, by encrypting data within a computing environment in which a given software image is deployed (e.g., data of the software component or other data within a computing environment in which the software component is deployed). As a non-limiting example, the computing environment may be secured by controlling access to software components realized using the software images containing embedded secrets. As another non-limiting example, the computing environment may be secured using the secrets embedded in such software components to encrypt data at rest (e.g., in storage) or traffic data.

As a non-limiting example, a software component realized via a software image containing embedded secrets becomes configured to require data indicating possession of a corresponding secret by a system attempting to access the software component before allowing such access. As another non-limiting example, a software component realized via a software image containing an embedded private key becomes configured to encrypt data in the computing environment using the embedded private key such that the encrypted data can only be decrypted using a corresponding public key.

In an embodiment, the software image recipe for a software image which contains an embedded secret includes one or more software packages containing code that, when executed, causes a system executing the software image to secure a computing environment based on the secret embedded in that software image. To this end, the code may contain instructions that configure the system to encrypt data, which in turn may be utilized to perform authentication procedures, to secure data (e.g., data at rest or traffic data in transit), and the like.

In a further embodiment, the software image recipes for any software images to contain embedded secrets may include one or more software packages containing code that, when executed, causes a system executing the software image to perform an authentication process which is configured to decrypt data using the embedded secret and to determine whether an accessing system is authorized to access the software component realized via the software image or other data in the computing environment based on the embedded secret or secrets. In this regard, the embedded secrets may allow for effectively configuring the software images to realize authentication protocols when executed and used to create software components.

The software images created using the recipes may be stored in an image repository 112 for subsequent use. The recipes, along with other data used to build the software images (e.g., code retrieved from the code repositories 131, packages created using such code, and the like), may be stored in a database 113.

The computing environment 120 may be a client computing environment in which one or more servers 122 acting as clients for the image manager 111, the image repository 112, or both. To this end, the computing environment 120 includes one or more servers 122 running code used to realize software applications or otherwise to run code and, more specifically, to run code of software components including code among software images as discussed herein. To this end, the computing environment 120 may further include an image repository 121 utilized to store software images built by the image manager 111.

The computing environment 120 may further include one or more cybersecurity tools 123. Such cybersecurity tools 123 may be configured to monitor for potential cyber threats, to alert on potential cyber threats, to mitigate or remediate potential cyber threats, a combination thereof, and the like. In particular, in accordance with various disclosed embodiments, the cybersecurity tools 123 may be configured to alert on potential cyber threats and to include data indicating potentially vulnerable software images or portions thereof (e.g., packages), which in turn may be utilized to determine which software images may require rebuilding or redeployment (e.g., redeployment of the corresponding software component) as described herein. To this end, such alerts may be sent from the cybersecurity tools 123 to the servers 122, to the image manager 111, or both.

The computing environments 130-1 through 130-*n* (where n is an integer having a value greater than or equal to 1, also referred to as a computing environment 130 or as computing environments 130 for simplicity) may each include one or more code repositories 131. Such code repositories 131 may store code and, in particular, code released by developers or other entities that provide code intended to be packaged with other code to create code packages. Such code may be updated, for example, in new code releases, in order to patch vulnerabilities or otherwise improve the code. Code stored in the code repositories 131 may be downloaded (e.g., by the image manager 111) and utilized to build software images as discussed herein.

The user device 140 may be, but is not limited to, a personal computer, a laptop, a tablet computer, a smartphone, a wearable computing device, or any other device capable of receiving and displaying notifications. The user device 140 may be owned, operated, or otherwise used by a person or entity which may manage code deployed in the computing environment 120. As a non-limiting example, the user device 140 may be operated by a developer who manages code at least some of the software components deployed in the computing environment 120. The user device 140 may receive notifications (e.g., from the image manager 111) indicating that certain software images have been built or rebuilt and stored in the image repository 112. The user device 140 may be used to cause the servers 122 to download such software images for software component deployment (e.g., to download such software images and either store those in local storages of the servers 122, in the image repository 121, or both).

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure. For example, the image manager 111 may be deployed or otherwise realized in the computing environment 120 used to host the servers 122 on which software components are deployed without departing from the scope of at least some disclosed embodiments. Generally speaking, in at least some embodiments, any of the computing environments 110 through 130 may be combined at least partially (e.g., combining entities from different computing environments), or may be further separated into more computing environments (not shown), without departing from the scope of the disclosure.

Figure 2:
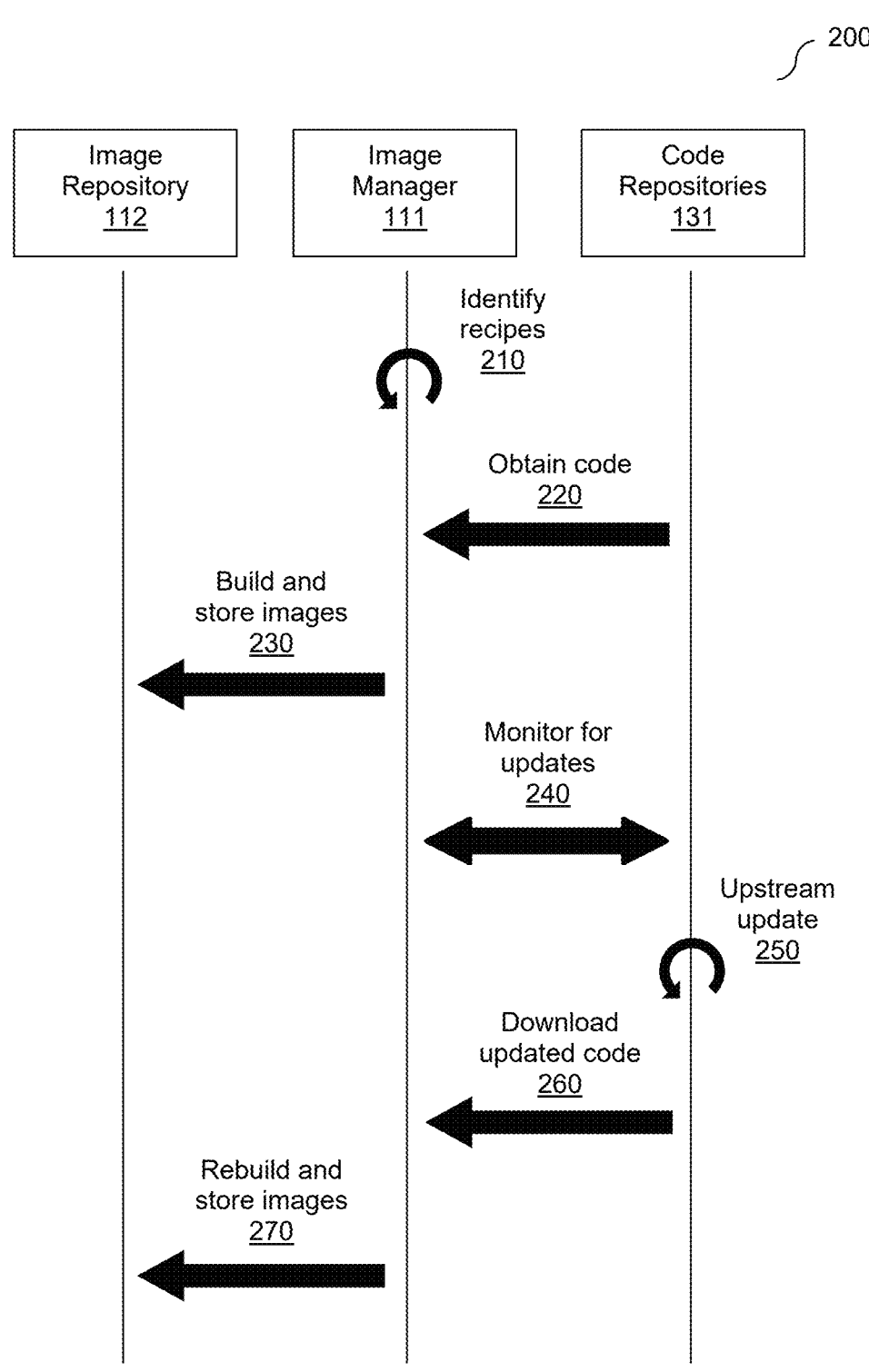
FIG. 2 is a flow diagram illustrating building and maintaining an image repository in accordance with various disclosed embodiments.

FIG. 2 is a flow diagram 200 illustrating building and maintaining an image repository in accordance with various disclosed embodiments. FIG. 2 depicts communications between and among the image repository 112, the image manager 111, and the code repositories 131, FIG. 1.

As depicted in FIG. 2, at 210, the image manager 111 identifies one or more software image recipes to be utilized for building software images in order to populate the image repository 112. Such recipes may be predetermined or otherwise provided by an entity that designs software images for use in deploying software components. As discussed herein, each recipe is a file including code defining packages to be combined in order to build a corresponding software image.

At 220, the image manager 111 obtains code from one or more of the code repositories 131. As discussed herein, such code includes code used to create packages or otherwise to build software images. The obtained code may be obtained as packages, or may be obtained as other discrete portions of code to be used for creating packages. When the software images are virtual machine images or other software images which utilize additional code or to run, the obtained code may further include such additional code (e.g., code of kernels and operating systems used to realize virtual machines).

At 230, the image manager 111 builds one or more software images and stores the built software images in the image repository 112. More specifically, as described herein, the image manager 111 builds the software images using software image recipes (e.g., the recipes identified at 210). That is, the image manager 111 builds the software images by combining packages and configuring the software images according to their corresponding recipes. When the software images are virtual machine images or other software images which utilize additional code to run, the software images may be built to include such code.

Once the image repository 112 has been populated with images built using the recipes, the image repository 112 may be updated as code used by those images are updated. To this end, in some embodiments, at 240, the image manager 111 monitors for updates to code in the code repositories 131 in order to identify updates to code (e.g., code releases) for code used by software images.

More specifically, as described herein, the image manager 111 may be configured to monitor for updates with respect to upstream code (e.g., as determined based on code dependencies of code in software images). When an upstream update occurs in one of the code repositories at 250, the image manager 111 may download the updated code at 260. The updated code, in turn, may be utilized to rebuild and store one or more of the software images at 270 (e.g., software images including older versions of the updated code may be rebuilt with the updated code).

It should be noted that FIG. 2 depicts a flow including both building and rebuilding images, but these processes may be realized as separate flows without departing from the scope of the disclosure. Additionally, in some embodiments, updated code may only be downloaded, images may only be rebuilt, or both, when certain conditions are met. As a non-limiting example, code may only be automatically downloaded and used to rebuild images when the code contains a vulnerability patch or other cybersecurity-relevant updates. In such embodiments, code may be manually downloaded and used to rebuild images at the direction of an operator (e.g., a user of the user device 140, FIG. 1) when inputs indicating certain portions of code to download, certain software images to check for potential code updates, or both, are received.

Figure 3:
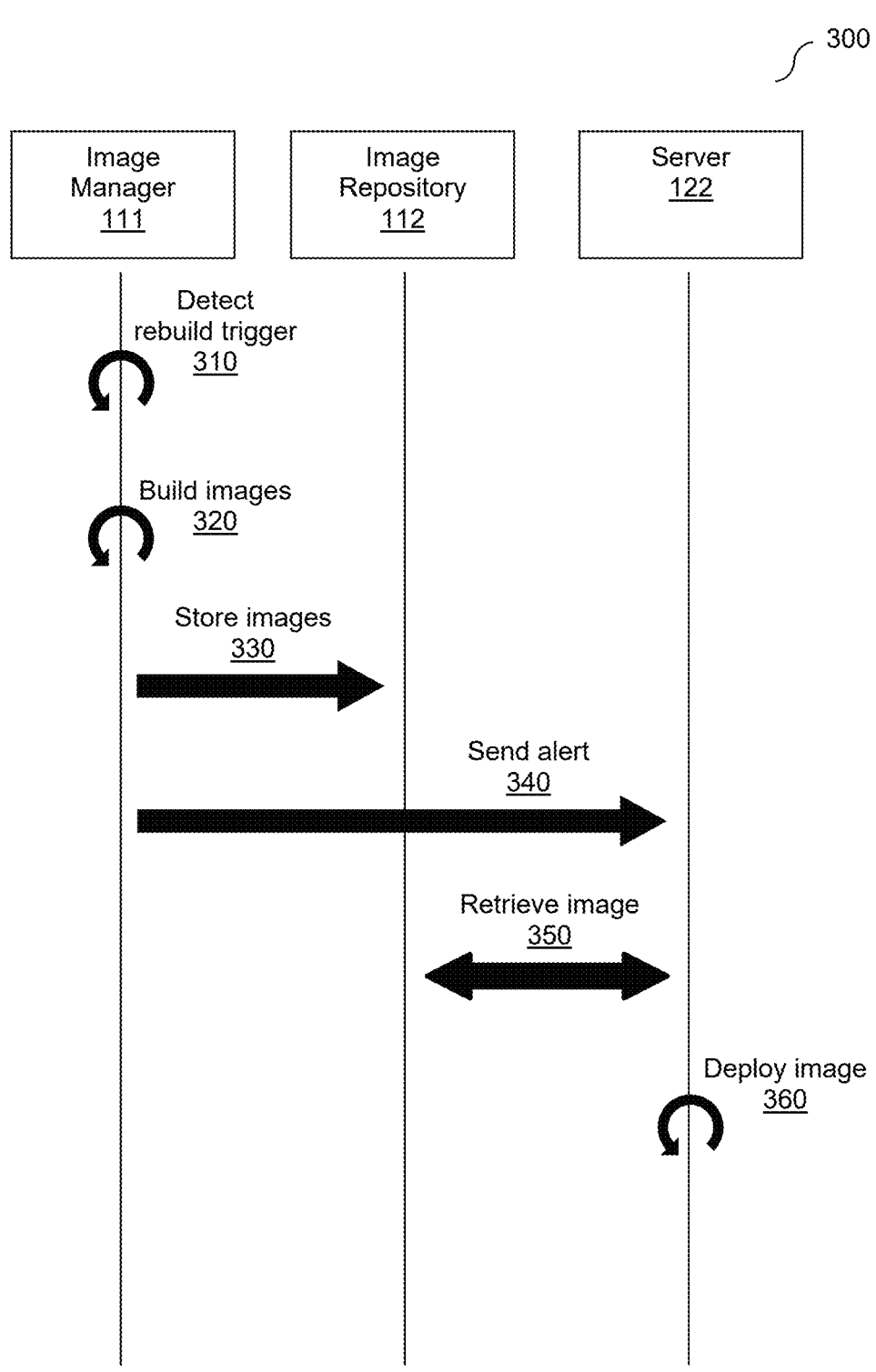
FIG. 3 is a flow diagram illustrating providing a new image for deployment in accordance with various disclosed embodiments.

FIG. 3 is a flow diagram 300 illustrating providing a new image for deployment in accordance with various disclosed embodiments. FIG. 3 depicts communications between and among the image repository 112, the image manager 111, and the server 122, FIG. 1.

As depicted in FIG. 3, optionally at 310, a rebuild trigger is detected. Such a rebuild trigger may be an update to code used by a software image, or may be such an update which meets certain criteria (e.g., includes vulnerability patches or other cybersecurity-related updates).

At 320, software images are built or rebuilt by the image manager 111. When images are rebuilt, updated code for those images may be downloaded and used for rebuilding. At 330, the newly built or rebuilt images are stored in the image repository 112.

At 340, the image manager 111 may generate and send an alert to one of the servers 122. The alert may indicate, for example, that a given software image has been rebuilt and is available for download, whether the software image includes a cybersecurity update (e.g., includes code with a vulnerability patch), both, and the like.

When the server 122 has received the alert, the server 122 may retrieve an image from the image repository 112 at 350 and deploy the retrieved image (e.g., by running the image in order to deploy the corresponding software component for the image).

It should be noted that FIG. 3 depicts the server 122 retrieving an image directly from the image repository 112 in accordance with at least some embodiments, but that the image may be obtained by the server 122 in other ways in at least some embodiments.

For example, in some embodiments, the image manager 111 may transmit the image to the server 122 at 340 in addition to or instead of sending the alert.

Figure 4:
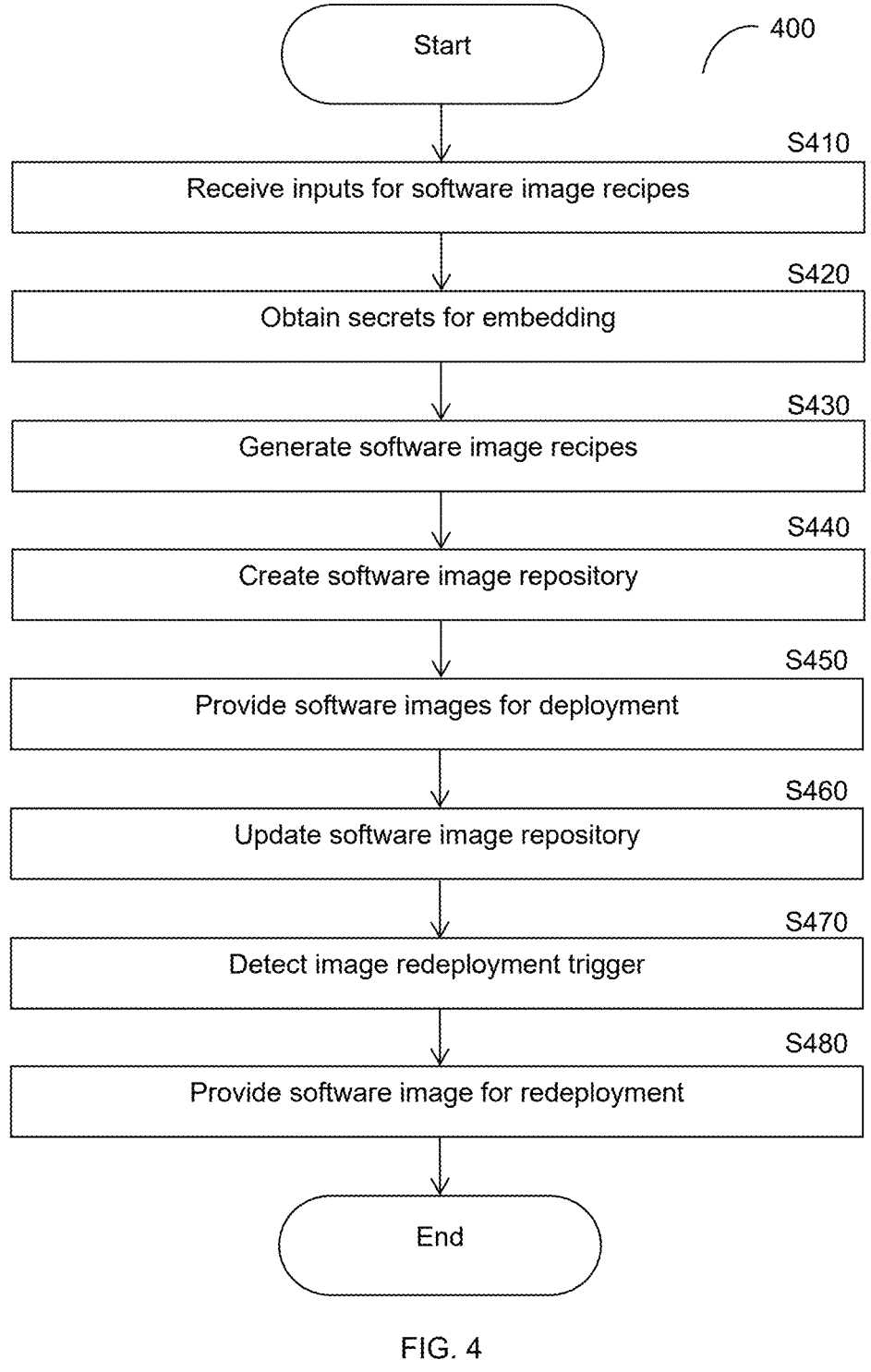
FIG. 4 is a flowchart illustrating a method for securing software components using software images containing embedded secrets according to an embodiment.

FIG. 4 is a flowchart 400 illustrating a method for software image update management according to an embodiment. In an embodiment, the method is performed by the image manager 111, FIG. 1.

At S410, inputs to be utilized for defining packages for software image recipes are received. The inputs may include, but are not limited to, inputs indicating combinations of packages to be used for building respective software images, inputs indicating secrets to be embedded in software images, both, and the like. In some implementations, the inputs may be user inputs received from, for example, a user device (e.g., the user device 140, FIG. 1).

The inputs indicating each to be embedded in the software images may be or may include, the secret itself, a pointer to a location in storage or other reference to a location of the secret, both, and the like. As discussed further below, secrets may be replaced or otherwise updated, thereby triggering rebuilding of software images in which the replaced secret is embedded (e.g., rebuilding the software image using a new or otherwise updated secret). Accordingly, defining the secrets with respect to a location in storage or other location reference allows for conveniently retrieving the updated secret as needed.

At S420, secrets for embedding are obtained. In an embodiment, obtaining the secrets includes receiving the secrets, retrieving the secrets, or a combination thereof (e.g., receiving some of the secrets and retrieving other secrets). When the software image recipes define locations in storage or other references to locations of the secrets, obtaining the secrets may include retrieving those secrets from their respective locations indicated in the applicable software image recipes.

In an embodiment, the secrets may be or may include, but are not limited to, keys. In a further embodiment, the key is a string of characters. Such a key may be, but is not limited to, a cryptographic key and, in at least some embodiments, a private key. The secrets, when embedded into respective software images, may be utilized to control access to a software component (e.g., a software component realized using a software image containing an embedded secret) or other data in a computing environment in which the software images are deployed. To this end, the secrets may be utilized to encrypt data or otherwise to perform an authentication procedure. As a non-limiting example, when the secrets are used to perform an authentication procedure in order to control access to a software image, a system controlling such access may be configured to require data indicating possession of a corresponding secret by a system attempting to access the software component before allowing such access.

To this end, in yet a further embodiment, the key is a private key which has a corresponding public key. In such an embodiment, the private key may be used to encrypt data, and the public key may be used to decrypt data encrypted using the private key. Accordingly, a second system having access to the public key may be configured to utilize the public key to authenticate to a first system which is configured to control access to the software component or otherwise to decrypt data in order to access the contents of the decrypted data. As a non-limiting example, the second system may send a message encrypted using the private key for the first system to decrypt, and the first system may only authenticate in order to access the software component if the first system can successfully decrypt the message and return the correct decrypted message to the second system.

In some embodiments, the secrets may be or may include one or more signatures.

For example, a secret may be a predetermined trusted signature which is created using a key or another secret. Such a trusted signature may be a portion of data signed using such a key or other secret. To this end, in some embodiments where the embedded secret for a software image is a signature, the software image recipe may include the signature to be embedded and may define the combination of packages for the software image as including a first package having code that, when executed by a system, configures the system to control access to a software component (e.g., the software component realized using the software image) or other data in a computing environment in which the software image is deployed based on the embedded signature. More specifically, when a first system attempts to access a software component whose access is controlled by a second system, the second system may be configured to authenticate the first system by verifying that the first system has presented the signature which is embedded in the software image used to realize the software component. If the first system is unable to present that signature, then the first system may be denied access to the software component.

At S430, one or more software image recipes are generated. In an embodiment, each software image recipe corresponds to a software image and is defined with respect to a set of packages. To this end, in a further embodiment, each software image recipe includes instructions for combining the respective set of packages in order to generate the corresponding software image. That is, each software image recipe defines a corresponding software image with respect to a combination of packages such that a software image created using the software image recipe includes the combination of packages.

As discussed herein, the packages may be identified with respect to certain identifiers that do not change as new versions or other releases of the code of those packages are released. As a result, a software image may be rebuilt using the newest release of the code of the packages defined in the corresponding software image recipe in order to effectively update the software image with new code, for example, new code that patches a vulnerability or otherwise avoids a security flaw.

In an embodiment, at least some of the software image recipes include instructions for embedding one or more secrets in their corresponding software images. More specifically, the instructions may include one or more of the secrets obtained at S430 and further define the software image as having these secrets embedded therein in addition to defining the software image with respect to the combination of packages. Accordingly, when a software image is created using a software image recipe defining the software image as containing an embedded secret, creating the software image includes embedding the secret.

In a further embodiment, the combination of software packages for each software image recipe defining the corresponding software image as containing the embedded secret includes one or more first software packages among a set of potential software packages that include code which, when executed by a system (e.g., one of the servers 122, FIG. 1), configures the system to secure a computing environment based on the embedded secret, for example by encrypting data using the embedded secret or controlling access to a software component based on the embedded secret. The software component may be, for example, any software component realized using the resulting software image.

In an embodiment, controlling access to the software component based on the embedded secret includes authenticating entities attempting to access the software component based on the embedded secret. To this end, such authentication may include, but is not limited to, checking if the entity attempting access has the secret or if the entity attempting access has an associated data item (e.g., a corresponding public key when the secret is a private key). Checking if the entity attempting access has access to the secret or an associated data item may be utilized to ensure that only authorized entities can access the software component realized using the resulting software image.

At S440, a software image repository is created. In an embodiment, creating the software image repository includes building one or more software images according to respective software image recipes (e.g., among the software image recipes obtained at S430) and storing the built images in the software image repository.

As discussed above, such a software image recipe may be or may include a file having executable code utilized to realize a given software component such as, but not limited to, a software container, a virtual machine, and the like. To this end, each software image recipe may be realized as a file including a set of instructions for building and configuring a software component such as a software container or virtual machine according to a predetermined definition of the software component. The set of instructions of each software image recipe may therefore be utilized to effectuate a set of rules for building and configuring the software component. As further discussed above, in an embodiment, at least some of the software image recipes define their corresponding software images as containing embedded secrets.

More specifically, the set of instructions of each software image recipe at least defines a corresponding software image with respect to a combination of packages such that the software image built using a given software image recipe includes each package among the combination of packages of the software image recipe. To this end, the set of instructions of each software image includes a description of each package to be used for building the software image and a description of how to obtain a latest version or release of the code of each package. The description of each package may be or may include an identifier (e.g., a name or identification number) of each portion of code used to create the package, a location (e.g., a location within a repository or otherwise a location in storage) of the package or of the code used to create the package, both, and the like. The description of how to obtain the latest version or release of the code of each package may be or may include an indication of a location where each portion of code for each package is stored (e.g., in one or more code repositories).

Each software image built using a corresponding software image recipe includes all of the code utilized to run a given software component, and may further include libraries, binaries, settings, and other data used to realize the corresponding software component. When a software image is for a virtual machine, the software image may further include an operating system, applications, and other data used to realize a virtual machine. The corresponding software image recipe for a given software image may therefore identify such code and other data (e.g., by location in storage, by identifier, by a combination thereof, and the like) such that a software image may be built at least by combining packages identified in the corresponding software image recipe.

In an embodiment, at least some of the software images built using corresponding software image recipes contain embedded secrets. To this end, at least some of the software image recipes define their corresponding software images with respect to the secrets to be embedded in their corresponding software images. Accordingly, such recipes may include or otherwise indicate the secrets to be embedded.

In a further embodiment, the software image recipes indicating secrets to be embedded define their respective combinations of packages as including one or more packages containing code that, when executed by a system, configures the system to authenticate other systems attempting to access a software component using the embedded secret, to encrypt data using the embedded secret, both, and the like. This, in turn, allows those systems to control access to the software components or other data in the computing environment based on the embedded secrets, thereby securing the computing environment using the software images built using software image recipes as described herein.

An example process for creating a software image repository is described further below with respect to FIG. 5.

At S450, one or more of the software images from the software image repository are provided for deployment (e.g., deployment by one of the servers 122, FIG. 1). Deployment of such a software image may include, but is not limited to, executing code of the software images in order to realize and deploy a corresponding software component defined by that software image.

In an embodiment, providing the software image for deployment includes storing the software image in a repository (e.g., the image repository 112 or the image repository 121, FIG. 1). The software image may be retrieved by one or more servers (e.g., the servers 122, FIG. 1) from the repository, either directly or by sending a request to a system having access to the repository (e.g., the image manager 111, FIG. 1).

At optional S460, the software image repository may be updated. In an embodiment, updating the software image repository includes rebuilding one or more of the software images using their corresponding software images (e.g., rebuilding each of those images using the newest version or release of the packages defined in their corresponding software image recipes).

In an embodiment, the software image repository is updated when a new secret is to be used for a given software image. As a non-limiting example, when a first secret has been replaced with a new second secret (e.g., when a new secret is received or otherwise obtained), any software images in which the first secret was embedded may be rebuilt using the second secret. To this end, S460 may include obtaining the new secret (e.g., receiving the new secret), receiving a notification indicating the replacement of the secret, and the like. In this regard, in an embodiment, the replacement of a secret may act as a trigger to rebuild one or more software images (i.e., images in which the replaced secret was embedded).

Alternatively or in combination, the software image repository may be updated with new software images when code used to build those software images has been updated. As a non-limiting example, as new code releases are made available such that code used by software images becomes updated, some or all of those software images may be updated accordingly by downloading new code, packaging the new code into new packages, and combining the new packages according to the corresponding software image recipes for software images. To this end, in an embodiment, updating the software image repository includes rebuilding one or more of the software images stored in the software image repository. An example process for updating the software image repository is described further below with respect to FIG. 6.

At optional S470, a software image redeployment trigger may be detected. The redeployment trigger may be defined such that software images are only redeployed when certain criteria are met. To this end, in an embodiment, detecting the software image redeployment trigger includes applying one or more redeployment trigger detection rules defined with respect to such criteria. In some embodiments, the redeployment trigger detection rules may be defined such that the trigger is detected when a vulnerability in a software image is being exploited.

In some embodiments, the redeployment trigger may be defined with respect to cybersecurity threats such that a software image is redeployed when a cyber threat or potential cyber threat is detected, when a vulnerability is identified, and the like. In a further embodiment, a redeployment trigger is detected when a vulnerability in one or more software components deployed using one or more of the software images is actively being exploited. An example process for detecting a software image redeployment trigger based on cybersecurity data which may be utilized at S430 is described further below with respect to FIG. 7.

At S480, the software image is provided for redeployment. In an embodiment, providing the software image for redeployment includes storing the software image in a repository (e.g., the image repository 112 or the image repository 121, FIG. 1). The software image may be retrieved by one or more servers (e.g., the servers 122, FIG. 1) from the repository, either directly or by sending a request to a system having access to the repository (e.g., the image manager 111, FIG. 1).

In some implementations, the software image may be provided to an air-gapped device which is not connected to any networks. In an embodiment, to support such implementations, providing the software for deployment may include, but is not limited to, storing the software image in a repository which is accessible to a system from which the software image may be loaded onto an external storage (e.g., a Flash drive), which in turn may be connected to the air-gapped device in order to deliver the software images stored on the external storage to the air-gapped device.

When the software image has been stored in such a repository, the external storage may be connected to a system, and the system may be utilized to download or otherwise retrieve the software image from the repository. The system may further be used to load the software image onto the external storage, and the external storage may be moved to a physical location of the air-gapped device in order to allow for connecting the external storage to the air-gapped device. When the external storage is connected to the air-gapped device, the software image may be copied or transferred to the air-gapped device.

Figure 5:
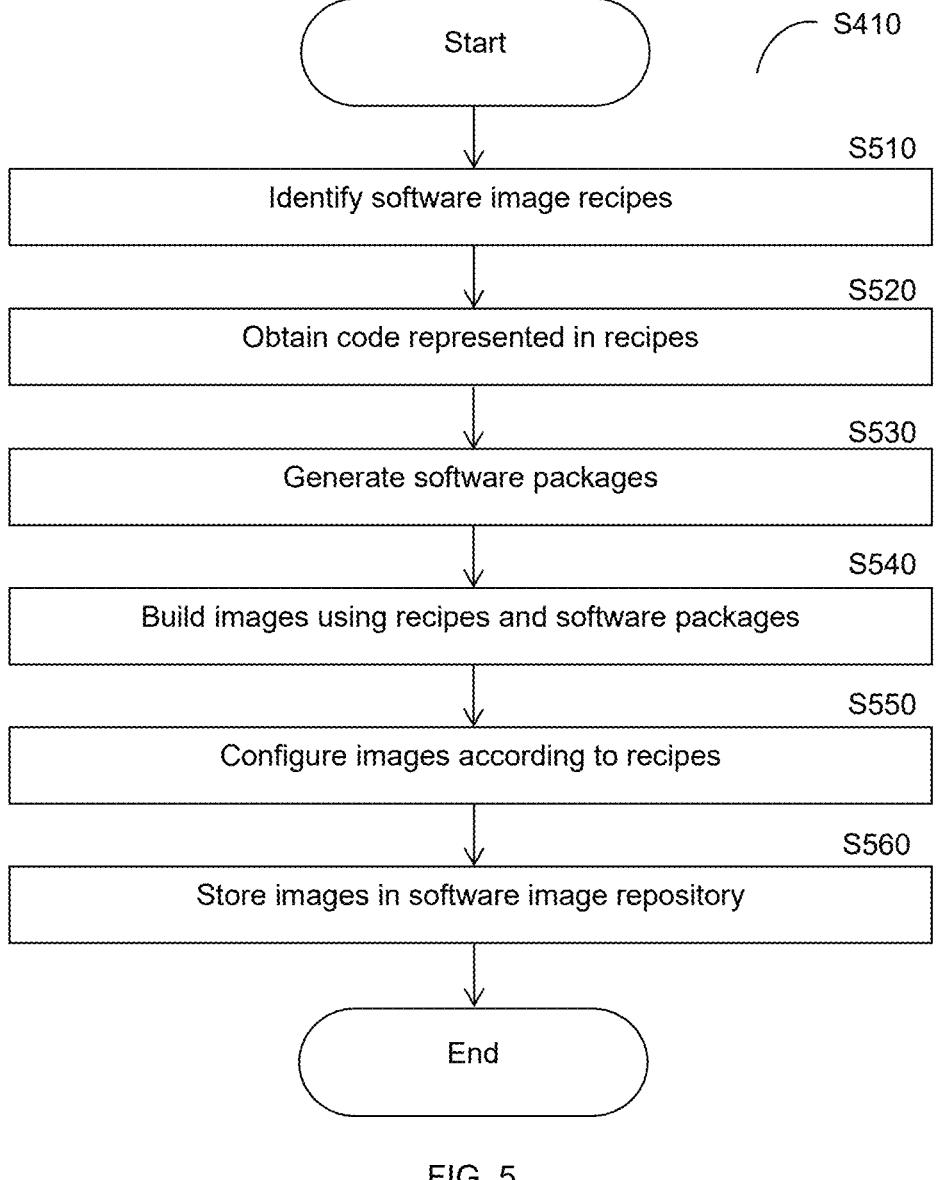
FIG. 5 is a flowchart illustrating a method for creating a software image repository according to an embodiment.

FIG. 5 is a flowchart S410 illustrating a method for creating a software image repository according to an embodiment.

At S510, software image recipes to be used for creating software images are identified. The identified software image recipes may be or may include software image recipes among a predetermined list of recipes to be used for populating, for example, a given software image repository. Such a predetermined list may be defined, for example, by an entity which owns or operates a computing environment (e.g., the computing environment 120, FIG. 1) in which the software image repository resides, a computing environment in which servers utilize software images stored in the software image repository to deploy software components, both, and the like.

As noted above, each software image recipe may be or may include a file having executable code utilized to realize a given software component such as, but not limited to, a software container, a virtual machine, and the like. To this end, in an embodiment, each software image recipe is realized as a file including a set of instructions for building and configuring a software component such as a software container or virtual machine according to a predetermined definition of the software component. The set of instructions of each software image recipe may therefore be utilized to effectuate a set of rules for building and configuring the software component.

In a further embodiment, the set of instructions of each software image recipe defines a corresponding software image with respect to a combination of packages such that the software image built using a given software image recipe includes each package among the combination of packages of the software image recipe. To this end, the set of instructions of each software image includes a description of each package to be used for building the software image and a description of how to obtain a latest version or release of the code of each package as discussed above, for example with respect to FIG. 4. In yet a further embodiment, the set of instructions for each software image recipe further defines a configuration for the corresponding software image, and the software image built using a corresponding software image recipe is configured in order to match the configuration defined in the corresponding software image recipe.

At S520, code of software packages (also referred to as packages) represented in the identified software image recipes is obtained. Such code may be, for example but not limited to, retrieved from one or more code repositories (e.g., one or more of the code repositories 131, FIG. 1). The code may include, but is not limited to, binaries or other code to be included in respective packages. In an embodiment, S520 may further include obtaining any associated files (e.g., files associated with respective binaries containing libraries or other resources to be used by those binaries).

In an embodiment, the code may be included in package definitions of packages which define portions of code to be utilized for creating each package. Such package definitions may identify code with respect to identifier, location (e.g., location in storage), and the like. In such an embodiment, the code may therefore be obtained based on such package definitions, for example by obtaining code having certain identifiers or locations in storage.

At S530, software packages (also referred to as packages) are generated using the obtained code. In an embodiment, the packages may be generated using package generation rules which define how each package is to incorporate each portion of code included therein. More specifically, the package generation rules may define templates or other predetermined portions of packages into which portions of code are to be inserted or otherwise which are to be combined with portions of code.

In some embodiments, any or all of the obtained code may be retrieved in a pre-packaged format (e.g., already organized into software packages). In such embodiments, any such pre-packaged software packages may be utilized to build software images during subsequent processing.

At S540, software images are built using their corresponding software image recipes and the packages generated at S530, any pre-packed software packages, or both. That is, each software image is built using its corresponding software image recipe by at least combining packages according to the software image recipe. More specifically, for each recipe, a subset of the packages generated at S530 or otherwise a subset of a set of packages is combined in order to build the corresponding software image for the recipe.

At S550, the software images are configured according to their corresponding software image recipes. As noted above, each software image recipe may include configuration instructions or otherwise provide configuration data indicating how the software image is to be configured.

At S560, the built software images are stored in one or more software image repositories (e.g., the repository 112, FIG. 1) for subsequent use or access.

Figure 6:
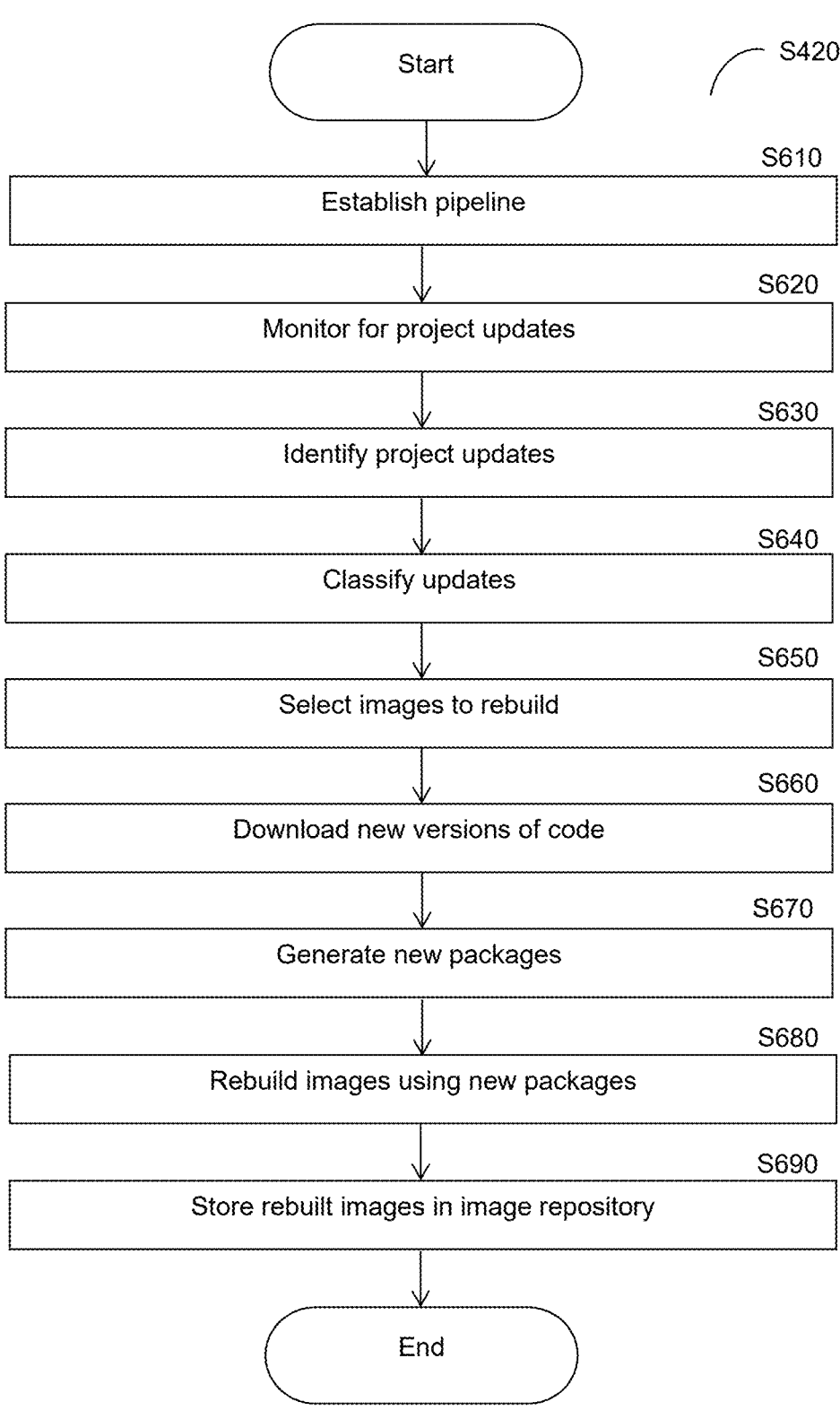
FIG. 6 is a flowchart illustrating a method for updating a software image repository according to an embodiment.

FIG. 6 is a flowchart S420 illustrating a method for updating a software image repository according to an embodiment.

At S610, a pipeline is established at least with respect to software packages used for building software images (e.g., software packages indicated in software image recipes as described herein). The pipeline may be defined with respect to one or more software projects (e.g., a software infrastructure project), and may further be defined from upstream to downstream. That is, the pipeline indicates or otherwise represents dependencies between portions of code deployed as part of the software project from upstream to downstream, where packages or portions of code containing dependencies to other code are considered to be downstream of the other code (which is considered to be upstream of the code which depends from it).

Accordingly, in an embodiment, the pipeline is established with respect to code dependencies. In a further embodiment, the pipeline defines dependencies between portions of code among different packages. That is, the pipeline defines relationships between such portions of code which may be useful for determining when a package is to be updated. When a portion of code is the subject of a new code release or otherwise when a new version of that code is made available, any package containing that code or containing code which depends from that code may be identified for recreation.

At S620, project updates are monitored with respect to the pipeline. In an embodiment, monitoring for project updates includes monitoring code releases, version updates, or other changes in code related to the software project. When a code release or other change to a portion of code used or otherwise upstream from a package indicated in a software image recipe is detected during the monitoring, that code release or other change may be identified as a project update as discussed with respect to S630. A code release may be determined as upstream from a package when the code release is for a portion of code from which the package depends (either directly via a reference to the portion of code among code of the package, or indirectly via a reference to code which in turn references other code that ultimately references the portion of code).

In an embodiment, the project updates may be detected based on certain activities such as, but not limited to, commits. To this end, the monitoring may be performed using update monitoring rules defined with respect to such activities such that project updates are detected when such activities occur (e.g., when a commit is made).

At S630, project updates are identified based on the monitoring. The project updates may be represented in data (e.g., textual data) indicating changes or other data indicative of updates to code used among entities represented in the pipeline. Such textual data may include, but is not limited to, log data, which may include textual data describing the nature of the changes, the reasons for the changes (e.g., to patch out a vulnerability or otherwise improve the code), both, and the like. As noted above, such project updates may be code releases, version updates, or other changes in code.

At optional S640, the identified project updates may be classified into one or more classifications. In an embodiment, classifying the updates includes applying one or more update classification rules defined with respect to, for example, keywords or key terms. As a non-limiting example, updates may be classified as either relating to cybersecurity or not relating to cybersecurity using update classification rules that define a given update as being related to cybersecurity when any of the following terms are included in a description of an update: "patch," "vulnerability," "cybersecurity," "security," and "CVE" (common vulnerabilities and exposures).

In another embodiment, classifying the project updates includes applying one or more machine learning models trained to classify textual data. Such machine learning models may be applied to text indicating changes or other data indicative of project updates identified during the monitoring.

In an embodiment, at least some of the classifications of the project updates are defined with respect to potential cybersecurity risks. That is, the classifications may indicate, for example, whether each update indicates a change meant to mitigate a cyber threat or remediate a vulnerability.

In some embodiments, the applied machine learning models may be or may include a language model such as a large language model (LLM). Such LLMs may be useful for querying with respect to text written in natural language in addition to or instead of code in order to unearth information about the contents of the text, code, or both. To this end, in such embodiments, classifying the project updates may include querying such a language model using a predetermined textual query. As a non-limiting example, such a textual query may be or may include "Please analyze the description of the updates and output a classification of either 'patching a vulnerability' or 'not patching a vulnerability.' The 'patching a vulnerability' output should be output when the description of the update indicates that the update was made to patch or fix a vulnerability in code, or if the code contains changes associated with patching vulnerabilities. The 'not patching a vulnerability' output should be output when the description of the update does not indicate that the update was made to patch or fix a vulnerability in code and the code does not contain any changes associated with patching vulnerabilities."

In yet a further embodiment, such language models may be fine-tuned for classifying upstream changes. Such a fine-tuned model may be created by adjusting weights of a general purpose language model based on further training using training samples which include example text describing project updates, such as samples demonstrating both vulnerability patch updates and other updates (e.g., general performance updates or other changes which may not be related or may not be directly related to cybersecurity). Such a fine-tuned language model may be further trained based on code of such example updates.

At optional S650, software images are selected for rebuilding. In an embodiment, the software images to be rebuilt are selected based on the classifications. In a further embodiment in which the classifications are defined with respect to cybersecurity issues (e.g., "vulnerability patch" or "no patch"), software images including code having project updates classified as being cybersecurity-related (e.g., "vulnerability patch" rather than "no patch") may be selected as the software images to be rebuilt. That is, software images with packages (e.g., as defined in the software image recipe for each software image) containing code that has been updated to patch a vulnerability or otherwise remediate or mitigate a potential cyber threat may be selected for rebuilding.

Classifying updates with respect to cybersecurity factors therefore allows for automatically rebuilding images only when code changes are provided to remediate cybersecurity issues. In turn, such selective automatic rebuilding allows for conserving computing resources related to building, transmitting, storing, and deploying software images. In this regard, it is noted that not all code releases are security critical or otherwise relevant to cybersecurity, and that rebuilding software images using every such non-cybersecurity code release may utilize many computing resources in order to provide updates which do not significantly affect performance. Accordingly, automatically rebuilding images only for security-related updates may allow for conserving computing resources while still allowing for manual updates (e.g., selections of images to be rebuilt by a manual operator) in order to, for example, improve performance of software images.

At S660, new versions of code to be used for rebuilding software images are downloaded based on the identified project updates. When software images to be rebuilt are selected as described with respect to S650, the new versions of code to be downloaded may include new versions of any code included in the selected software images.

At S670, new packages may be generated using the downloaded code. In an embodiment, the new packages may be generated using package generation rules which define how each package is to incorporate each portion of code included therein. More specifically, each package including code which has been identified as being updated may be used to generate a respective new package including the updated code.

At S680, one or more software images are rebuilt using the new packages. In an embodiment, the software images are rebuilt based on their corresponding software image recipes. For any software image recipes identifying packages including one or more of the new packages, the corresponding software image is therefore rebuilt using the new package instead of a previous version of the package, thereby creating an updated software image by rebuilding the software image with one or more new packages containing updated code.

At S690, the rebuilt images are stored in one or more software image repositories (e.g., the repository 112, FIG. 1) for subsequent use or access.

FIG. 7 is a flowchart S430 illustrating a method for detecting a software image redeployment trigger according to an embodiment.

At S710, cybersecurity data is ingested. The ingested cybersecurity data may include, but is not limited to, events, alerts, notifications, or other data which may indicate potential cyber threats. More specifically, in an embodiment, the cybersecurity data includes data indicating vulnerabilities which are being exploited. In such embodiments, the cybersecurity data may further indicate specific packages, code releases, or other portions of code which include the vulnerability being exploited.

At S720, a vulnerability being exploited is identified based on the cybersecurity data. Identifying the vulnerability being exploited may include analyzing the cybersecurity with respect to a predetermined structure of the cybersecurity data (e.g., a known structure having a field which corresponds to a vulnerability being exploited) or otherwise analyzing the contents of the cybersecurity data (e.g., analyzing text of the cybersecurity data using natural language processing) in order to identify an indication of a vulnerability which is being exploited by a given cyber threat.

At S730, a vulnerable package is identified based on the cybersecurity data. The vulnerable package may be, but is not limited to, a package indicated in the cybersecurity data, or a package containing code indicated in the cybersecurity data. Identifying the vulnerable packages may include analyzing the cybersecurity with respect to a predetermined structure of the cybersecurity data (e.g., a known structure having a field which corresponds to a vulnerable package or vulnerable code) or otherwise analyzing the contents of the cybersecurity data (e.g., analyzing text of the cybersecurity data using natural language processing) in order to identify an indication of a vulnerable package or portion of code which is being exploited by a given cyber threat.

At S740, software images including the vulnerable package are identified based on software image recipes. As noted above, each software image recipe is a file indicating a set of packages which are combined in order to build a corresponding software image. Accordingly, each corresponding software image which is built using one of the software image recipes which indicates the vulnerable package as one of the packages to be combined may be identified as a vulnerable image including the vulnerable package.

At S750, rebuilding is triggered with respect to any vulnerable images including one or more vulnerable packages. To this end, in an embodiment, S750 includes rebuilding one or more vulnerable images. More specifically, any vulnerable images are rebuilt according to their corresponding software image recipes using patched or otherwise updated packages (e.g., packages containing updated code designed to avoid the identified vulnerability which is being exploited). In yet a further embodiment, rebuilding the vulnerable images includes downloading updated versions of code for use in rebuilding the vulnerable images.

In some embodiments, S750 may further include triggering redeployment of any vulnerable images. To this end, in such embodiments, the rebuilt images are pushed to repositories or otherwise provided to servers used for deploying software components defined by respective software images. In a further embodiment, such servers may be commanded, instructed, or otherwise prompted to retrieve and redeploy the updated version of each vulnerable image currently being used by each server.

At optional S760, an alert may be generated. The alert may indicate, for example, that one or more software images have been redeployed, which packages were identified as vulnerable, which vulnerabilities were being exploited, which software images have been redeployed, and the like. The alert may be sent, for example, to a user device (e.g., the user device 140, FIG. 1).

It should be noted that FIG. 7 is discussed with respect to identifying one vulnerable package, but that multiple vulnerable packages may be identified without departing from the scope of the disclosure. Software images containing any identified vulnerable packages may be identified and redeployed as described above.

FIG. 8 is an example schematic diagram of an image manager 111 according to an embodiment. The image manager 111 includes a processing circuitry 810 coupled to a memory 820, a storage 830, and a network interface 840. In an embodiment, the components of the image manager 111 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the image manager 111 to communicate with other systems, devices, components, applications, or other hardware or software components, for example as described herein.

It should be understood that the embodiments described herein are not limited to the specific architecture illustrated in FIG. 8, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for securing software images, comprising:

generating a plurality of software packages, wherein each software package is generated using a respective set of code, wherein a first software package of the plurality of software packages includes code that configures a server to secure a computing environment based on a secret when executed;

building a software image based on a file, wherein the file includes a set of instructions for combining a subset of the plurality of software packages including the first software package and for embedding the secret in order to build the software image, wherein building the software image further comprises combining the subset of the plurality of software packages according to the file, wherein building the software image further comprises embedding the secret in the software image; and providing the software image for execution, wherein the software image is executed by the server, wherein the software image configures the server to deploy a software component based on the subset of the plurality of software packages when executed.

2. The method of claim 1, wherein the first software package further includes code that, when executed, configures the server to validate a signature based on the secret, wherein access is granted to the software component when the signature has been validated.

3. The method of claim 1, wherein the secret is a signature, wherein the server includes a processor and a memory, wherein the memory contains instructions that, when executed by the processor, configures the server to grant access to the software component when the signature is presented to the server.

4. The method of claim 1, wherein the secret is associated with at least one first computing environment of a plurality of computing environments, wherein each of the at least one first computing environment corresponds to a first entity of a plurality of entities, wherein the secret is only embedded in files among a plurality of files to be used for the at least one first computing environment.

5. The method of claim 1, wherein the secret is a first secret of a plurality of secrets, wherein the plurality of secrets is defined with respect to a hierarchy, wherein the server includes a processor and a memory, wherein the memory contains instructions that, when executed by the processor, configures the server to control access to the software component based further on the hierarchy.

6. The method of claim 1, wherein the server is a first server, wherein the secret is a private key, further comprising:

providing, to at least one second server deployed in a computing environment, a public key which corresponds to the private key, wherein each of the at least one second server includes a processor and a memory, wherein the memory of each second server contains instructions that, when executed by the processor of the second server, configures the second server to authenticate to the first server using the public key.

7. The method of claim 1, wherein the code of the first software package further configures the server to encrypt data in the computing environment using the secret when executed.

8. The method of claim 1, further comprising:

configuring each of the plurality of software images based on a plurality of files, wherein the set of instructions for each file further defines a configuration for the corresponding software image.

9. The method of claim 1, wherein each software package is a unit of code defined with respect to at least one function.

10. A non-transitory computer-readable medium having stored thereon instructions for causing a processing circuitry to execute a process, the process comprising:

generating a plurality of software packages, wherein each software package is generated using a respective set of code, wherein a first software package of the plurality of software packages includes code that configures a server to secure a computing environment based on a secret when executed;

building a software image based on a file, wherein the file includes a set of instructions for combining a subset of the plurality of software packages including the first software package and for embedding the secret in order to build the software image, wherein building the software image further comprises combining the subset of the plurality of software packages according to the file, wherein building the software image further comprises embedding the secret in the software image; and providing the software image for execution, wherein the software image is executed by the server, wherein the software image configures the server to deploy a software component based on the subset of the plurality of software packages when executed.

11. A system for securing software images, comprising:

a processing circuitry; and a memory, the memory containing instructions that, when executed by the processing circuitry, configure the system to:

generate a plurality of software packages, wherein each software package is generated using a respective set of code, wherein a first software package of the plurality of software packages includes code that configures a server to secure a computing environment based on a secret when executed;

build a software image based on a file, wherein the file includes a set of instructions for combining a subset of the plurality of software packages including the first software package and for embedding the secret in order to build the software image, wherein building the software image further comprises combining the subset of the plurality of software packages according to the file, wherein building the software image further comprises embedding the secret in the software image; and provide the software image for execution, wherein the software image is executed by the server, wherein the software image configures the server to deploy a software component based on the subset of the plurality of software packages when executed.

12. The system of claim 11, wherein the first software package further includes code that, when executed, configures the server to validate a signature based on the secret, wherein access is granted to the software component when the signature has been validated.

13. The system of claim 11, wherein the secret is a signature, wherein the memory further contains instructions that, when executed by the processor, configures the server to grant access to the software component when the signature is presented to the server.

14. The system of claim 11, wherein the secret is associated with at least one first computing environment of a plurality of computing environments, wherein each of the at least one first computing environment corresponds to a first entity of a plurality of entities, wherein the secret is only embedded in files among a plurality of files to be used for the at least one first computing environment.

15. The system of claim 11, wherein the secret is a first secret of a plurality of secrets, wherein the plurality of secrets is defined with respect to a hierarchy, wherein the memory further contains instructions that, when executed by the processor, configures the server to control access to the software component based further on the hierarchy.

16. The system of claim 11, wherein the server is a first server, wherein the secret is a private key, wherein the processor is a first processor, wherein the memory is a first memory, wherein the first memory further contains instructions that, when executed by the first processor, configures the first server to:

provide, to at least one second server deployed in a computing environment, a public key which corresponds to the private key, wherein the at least one second server includes at least one second processor and at least one second memory, wherein each second memory contains instructions that, when executed by one of the at least one second processor, configures one of the at least one second server to authenticate to the first server using the public key.

17. The system of claim 11, wherein the code of the first software package further configures the server to encrypt data in the computing environment using the secret when executed.

18. The system of claim 11, further comprising:
configuring each of the plurality of software images based on a plurality of files, wherein the set of instructions for each file further defines a configuration for the corresponding software image.

19. The system of claim 11, wherein each software package is a unit of code defined with respect to at least one function.

\* \* \* \* \*